United States Patent [19]

van der Lely

[11] 4,042,041
[45] Aug. 16, 1977

[54] ROTARY HARROWS

[76] Inventor: Cornelis van der Lely, 7, Bruschenrain, Zug, Switzerland

[21] Appl. No.: 562,415

[22] Filed: Mar. 27, 1975

Related U.S. Application Data

[60] Continuation of Ser. No. 504,076, Sept. 9, 1974, abandoned, which is a division of Ser. No. 312,882, Dec. 7, 1972, abandoned.

[30] Foreign Application Priority Data

Dec. 8, 1971   Netherlands .................... 7116820

[51] Int. Cl.² ............................................. A01B 33/06
[52] U.S. Cl. ........................................ 172/70; 172/78; 172/80; 172/112; 172/59; 172/49; 172/767; 111/63; 111/69
[58] Field of Search .................... 172/78, 59, 767, 112, 172/113, 63, 28, 49, 110, 111, 38, 39, 80, 70

[56] References Cited

U.S. PATENT DOCUMENTS

| | | | |
|---|---|---|---|
| 1,054,609 | 2/1913 | Perry | 172/78 |
| 1,186,375 | 6/1916 | Burrows | 172/78 X |
| 1,611,507 | 12/1926 | Biddle | 172/78 X |
| 1,871,026 | 8/1932 | Belli | 172/28 |
| 3,367,425 | 2/1968 | Heeren | 172/59 X |
| 3,604,513 | 9/1971 | Tassone | 172/59 X |
| 3,638,539 | 2/1972 | Lewis | 172/59 X |
| 3,774,689 | 11/1973 | van der Lely et al. | 172/112 |
| 3,930,542 | 1/1976 | van der Lely et al. | 172/112 X |

Primary Examiner—George J. Marlo
Attorney, Agent, or Firm—Mason, Mason & Albright

[57] ABSTRACT

A rotary harrow has soil-working members that are protected and, to some extent, supported from the ground by an elongated transverse beam that is pivoted to the front of the frame. The beam is spring biased to an operative location adjacent the soil-working member connections and vertically adjustable with respect to those members. The beam is rounded off at its lower surfaces to level the ground and ride along the ground. If debris becomes lodged between the beam and soil-working members, the beam can pivot forwardly against spring opposition to release the debris. The pivot axis for the beam is substantially directly above the beam itself.

5 Claims, 5 Drawing Figures

ROTARY HARROWS

This invention relates to a rotary harrow comprising a transverse frame with coupling means at the front of such frame for attaching the harrow to a prime mover. A plurality of soil working members rotatable mounted on upwardly extending shafts supported on said transverse frame portion and drive means connected to said shaft to rotate said soil working members.

According to the invention a rotary harrow of the kind set forth is provided with a soil leveling member in front of the said soil working members which soil leveling member extends throughout substantially the whole of the working width of said harrow and at least partly supports the harrow during operation.

For a better understanding of the invention and to show how the same may be carried into effect, reference will now be made, by way of example, to the accompanying drawings, in which.

Figure 1:
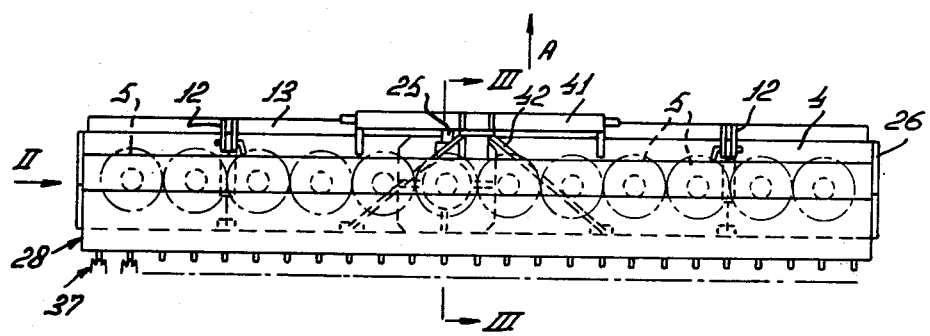
FIG. 1 is a plan view of a rotary harrow in accordance with the invention.
Figure 2:
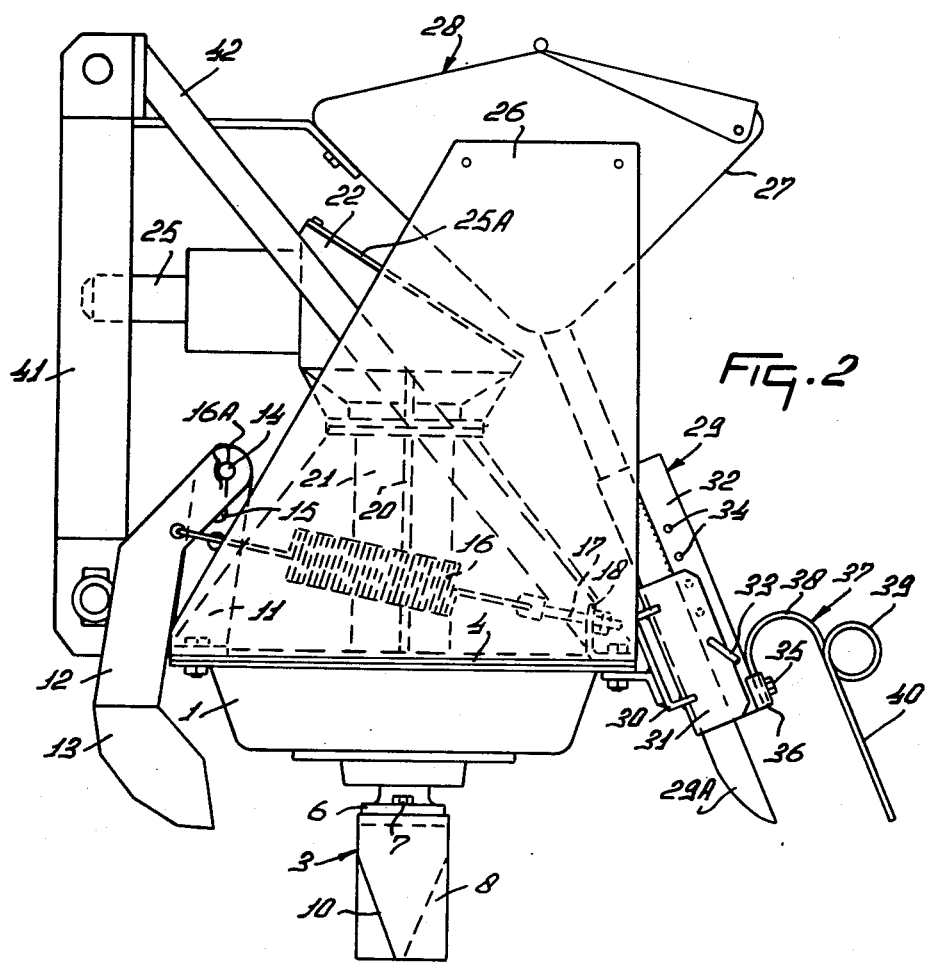
FIG. 2 is a side elevation, to an enlarged scale, as seen in the direction indicated by an arrow II in FIG. 1.

Referring to FIGS. 1 to 5 of the drawings, the rotary harrow or soil cultivator which is illustrated has a frame portion 1 of hollow box-like configuration that exten-ds substantially horizontally perpendicular to the intended direction of operative travel of the harrow which is indicated by an arrow A in FIG. 1. The frame portion 1 accommodates a plurality (in this case, 12) of vertical or substantially vertical rotary shafts 2 that are regularly spaced apart from one another in a single row by centre-to-centre distances of substantially 25 centimeters. The lowermost end of each shaft 2 carries a corresponding soil-working member or rotor that is generally indicated by the reference 3. Each shaft 2 is rotatably supported at the bottom of the frame portion 1 by a bearing and also by a further bearing at the top of said portion 1, the uppermost bearings being secured to a substantially horizontal top plate 4 of the frame portion 1 which top plate 4 is itself secured to the rims of an underlying dished plate of said frame portion by small bolts. Each shaft 2 is provided inside the hollow frame portion 1 with a corresponding spur-toothed pinion 5 and it will be seen in broken lines in FIG. 1 of the drawings that the teeth of each pinion 5 are in driven or driving and driven mesh with those of its neighbour or each of its two neighbours. The lowermost end of each rotary shaft 2 projects from the bottom of the frame portion 1 and is there provided with a substantially horizontally extending strong wrought iron flange 6 and each flange 6 has a horizontal portion 9 of a corresponding one of the soil working members or rotors 3 secured to it by two substantially vertical bolts 7 that are formed from a strong but relatively easily fractured material. The horizontal portion 9 of each soil working member or rotor 3 has its opposite ends connected to two upright blades 8 which blades, in this embodiment, are integral with the opposite ends of the portion 9, said blades 8 and portion 9 conveniently being made from single pieces of sheet metal. Each blade 8 preferably has a length of substantially 12 centimeters between its upper and lower extremities.

Figure 4:
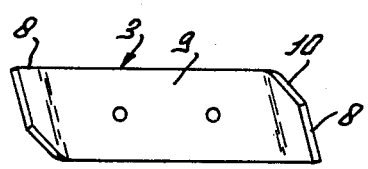
FIG. 4 is an underneath view of one part of the harrow as seen in the direction indicated by an arrow IV in FIG. 3.
Figure 5:
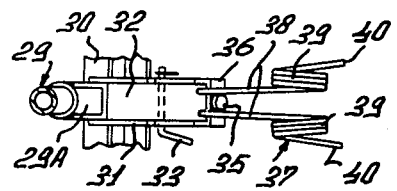
FIG. 5 is a section taken on line V—V of FIG. 3.

It can be seen from FIG. 4 of the drawings that the blades 8 of each soil working member or rotor 3 are turned or twisted to some extent about their own longitudinal axes and that their leading edges with respect to the intended directions of rotation of the corresponding shafts 2 are formed as rearwardly and downwardly inclined cutting edges 10 that extend throughout substantially two-thirds of the upright length of each blade 8. It will also be noted that, due to the aforementioned turning or twisting of the blades 8, the cutting edges 10 thereof are closer to the axes of rotation afforded by the corresponding shafts 2 than are the rearmost plain edges of the blades 8.

Upright brackets 11 are provided on top of the frame portion 1 and at the front thereof with respect to the direction A, said brackets 11 having arms 12 pivotally connected to them with the aid of substantially horizontal pins 14. The arms 12 extend downwardly and forwardly in pairs and their lowermost ends are interconnected by a substantially horizontal soil leveling member afforded by a beam 13 of light-weight construction that extends throughout substantially the whole of the working width of the harrow. It will be seen from FIGS. 2 and 3 of the drawings that the lower surface and front of the beam 13 with respect to the direction A is effectively rounded-off and that, in cross-section, said beam is generally inclined downwardly and rearwardly with respect to the direction A from its top. The pins 14 that afford pivotal connections between the brackets 11 and the arms 12 are entered through single aligned holes in the upper ends of the arms 12 but through any selected one of a number of vertically spaced holes 15 in each respective bracket 11. The pins 14 are located in substantial vertical alignment with the beam 13 and the front of frame portion 1, as seen in the drawings. Resilient "safety" pins 16A are passed through transverse bores near the ends of the pins 14 to retain those pins in their selected positions and it will be realised that the particular holes 15 which are selected for co-operation with the pins 14 determine the height of the beams 13 relative to the frame portion 1 thus governing to a large extent the depth of penetration of the blades 8 into the soil during operation of the harrow. A helical tension spring 16 is stretched between horizontally aligned holes in each pair of arms 12 and a corresponding adjusting screw 17, said holes in the arms 12 being formed at a level below that of the pivot pins 14. The longitudinal axes of the two springs 16 both extend substantially horizontally and the two adjusting screws 17 are entered through holes in supporting brackets 18 mounted at the top and rear of the frame portion 1, the shanks of the screws 17 being provided with pairs of nuts which can be displaced axially of the screws to increase or decrease the initial degree of tension of the springs 16 as may be required.

The shaft 2 of one of the central pair of soil working members or rotors 3 is provided with an upward extension 19 that is entered axially through a tube 21 that is fastened on top of the frame portion 1 by supports 20. The extension 19 has its upper end rotatably journalled in a gear box 22 and is provided inside that gear box with a bevel pinion 23. The bevel pinion 23 is in driven mesh with a smaller bevel pinion 24 located at the inner end of a forwardly projecting substantially horizontal rotary input shaft 25. It will be noted that the top of the gear box 22 is afforded by a removable plate 25A that is inclined downwardly and rearwardly from its leading edge to its rear edge with respect to the direction A.

Substantially vertical supports 26 located at the opposite lateral sides or ends of the frame portion 1 carry a funnel-shaped container or hopper 27 of a mechanism 28 for supplying materials such as seeds, fertilisers, pesticides and the like onto and/or into the soil, said hopper 27 being elongated in a substantially horizontal direction that is perpendicular to the direction A. The hopper 27 accommodates a feed mechanism 27A (FIG. 3) that is located above the upper ends of tubular delivery members 29 that extend from the base of the hopper 27 downwardly and rearwardly with respect to the direction A towards the rear of the harrow. The lowermost end of each tubular delivery member 29 is provided with an upwardly and downwardly displaceable portion 29A (FIGS. 3 and 5) the portions 29A being upwardly and downwardly displaceable relative to a support 30 carried at the rear of the frame portion 1. The support 30 carries a plurality of brackets 31 that are equal in number to the number of displaceable portions 29A and each bracket 31 houses, between its limbs, a corresponding slider 32 formed with a row of holes 34. The limbs of the brackets 31 are formed with single horizontally aligned holes and a horizontal locking pin 33 is provided for insertion through those holes and a chosen intervening hole 34 of the slider 32, the chosen hole 34 thus determining the setting of the corresponding displaceable portion 29A relative to the tubular delivery member 29 under consideration. The rear of each slider 32 with respect to the direction A is provided with a corresponding pair of tines 37 that are formed from a single length of spring steel or other resilient wire or rod. The junction between the two tines 37 of each pair takes the form of a substantially 180° bend which is fastened to the corresponding slider 32 by a clamp 36 and a bolt 35 entered between the limbs of said bend. Each pair of tines 37 extends upwardly from the corresponding clamped bend through substantially 180° curves 38 that are orientated rearwardly with respect to the direction A, the free ends of said bends 38 merging into 360° loops 39 which loops, in turn, terminate in straight working portions 40 that are downwardly and rearwardly inclined with respect to the direction A at substantially the same angles as the delivery members 29 to which they are indirectly connected.

The front of the frame portion 1 with respect to the direction A carries a generally triangular coupling member or trestle 41 that is adapted for connection, in a manner that is known per se, to the three-point lifting device or hitch of an agricultural tractor or other operating vehicle. Rearwardly and downwardly divergent tie bars 42 extend between the top of the coupling member 41 and locations at the top and rear of the frame portion 1. A strengthening strip 43 also extends between the top of the coupling member 41 and a central location at the front of the hopper 27, said strip 43 thus extending substantially parallel to the direction A.

Figure 3:
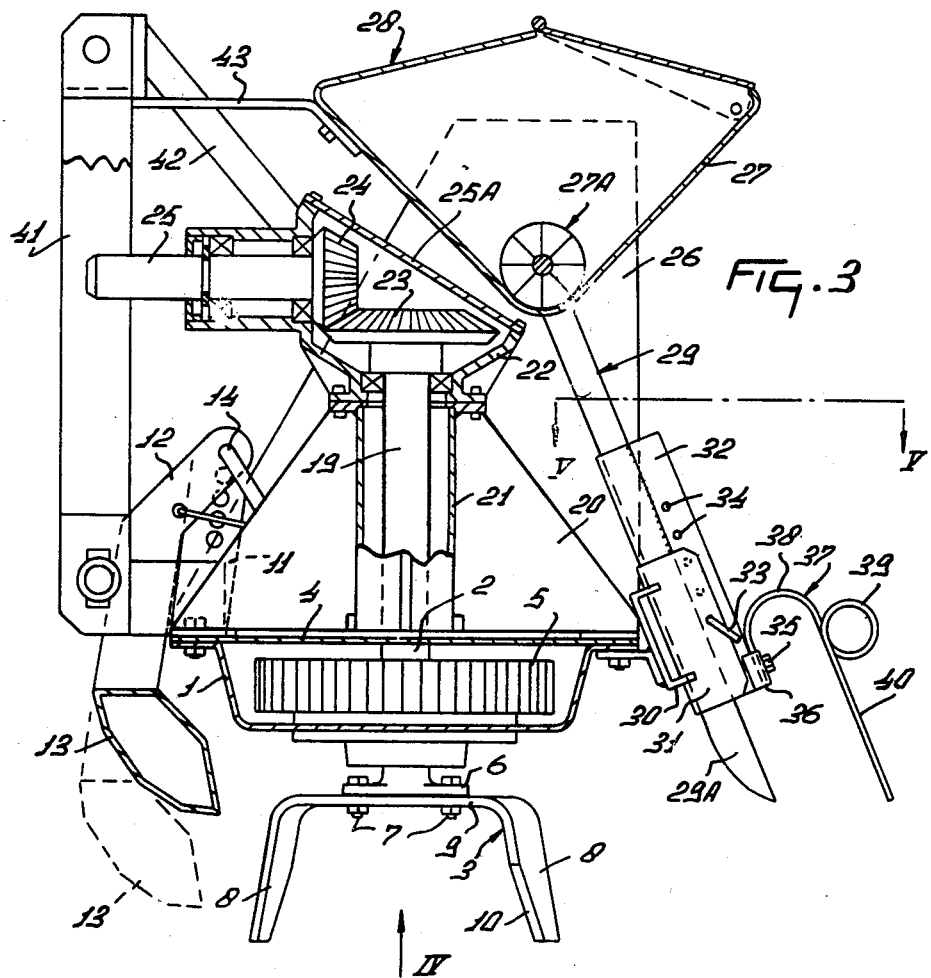
FIG. 3 is a section, to an enlarged scale, taken on the line III—III of FIG. 1.

In the use of the rotary harrow that has been described with reference to FIGS. 1 to 5 of the drawings, its coupling member or trestle 41 is connected in known manner to the three-point lifting device of an agricultural tractor or other operating vehicle and the leading end of the splined or otherwise keyed rotary input shaft 25 is placed in driven connection with the power take-off shaft of the same tractor or other operating vehicle with the aid of an intermediate telescopic transmission shaft (not shown) of known construction having universal joints at its opposite ends. After the beam 13 in front of the frame portion 1 has been adjusted to a desired height by entering the pins 14 through appropriate holes 15, the harrow can be moved upwardly out of operation and downwardly into operation by appropriate control of the lifting device or hitch of the tractor or other operating vehicle. As the harrow is moved operatively over a field in the direction A, the soil working members or rotors 3 are rotated from the gear box 22 in such a way that the two rotors 3 of each neighbouring pair revolve in opposite directions, all of the rotors 3 working individual strips of soil which overlap one another to produce, in effect, a single broad strip of worked soil because the distances between the blades 8 of each rotor 3 are greater than the perpendicular distances between the axes of rotation of neighbouring rotors 3 about their axes of rotation are angularly staggered to prevent the blades 8 from fouling one another during operation. The downwardly and rearwardly bevelled cutting edges 10 of the blades 8 are located foremost with respect to the direction of rotation of each rotor 3 and it has been found that the angularly twisted or turned positions of the blades 8 about their longitudinal axes minimises the risk of the blades cutting out large lumps or clods when heavy soil is being worked so that the number of such lumps or clods which are produced is very small indeed. Owing to the structure of the soil working members or rotors 3 which has been described above and which is illustrated in FIGS. 3 and 4 of the drawings, the cutting edges 10 of the blades 8 are nearer to the axes of rotation of the rotors than are the trailing edges of said blades and this ensures that the soil is frequently cut along its natural lines of rupture or breakage. The described and illustrated disposition of the leading cutting edges 10 of the blades 8 ensures that weeds, stubble and the like are readily chopped and loosened from the ground. As the rotary harrow moves forwardly over the soil that is to be worked, the soil leveling member in form of the beam 13 rides over the surface of that soil partially supporting the harrow and levelling the surface of the soil due to the effectively rounded-off leading and lower surface of the beam. If a stone or other obstacle should get one or more of the rotors 3 and the beam 13, said beam can deflect forwardly against the action of the springs 16 thus releasing the stone or other obstacle. As previously mentioned, the depth of penetration of the blades 8 into the soil can be varied by raising or lowering the horizontal level of the beam 13 relative to the rest of the harrow by engaging the pins 14 in appropriate holes 15. FIG. 3 of the drawings show two different possible horizontal settings of the beam 13 in full and broken lines respectively. If desired, the strip of land that has been worked by the blades 8 of the rotors 3 can immediately be sown with seeds by the mechanism 28. Said mechanism 28 will then function as a seed drill and all that is necessary is to move the sliders 32 downwardly to an extent that is suitable to match the operating level set by the position of the beam 13 and subsequently to replace the pins 33 in appropriate holes 34. The adjustment of the displaceable portions 29A which result simultaneously adjusts the positions of the tines 37 which tines serve to agitate the soil that has been formed into furrows by the preceding portions 29A, which serve as coulters under these circumstances, thus leaving a substantially smooth sown seedbed in which a very large majority of the seeds will be at the correct depth and covered with a layer of fine soil. The feed mechanism 27A may be driven from one end of the hopper 27 by an assembly that is not shown in the drawings but which comprises a ground-engaging wheel, roller or the like that is rotated by travel of the harrow over the ground in the direction A, such rotation being mechanically transmitted to the feed mechanism 27A. Alternatively, the mechanism 27A may be rotated by drive derived from the operating tractor or other vehicle through the intermediary of the rotary input shaft 25.

In the rotary harrow which has been described, the blades 8 of each of the soil working members or rotors 3 are preferably made from single pieces of sheet material which includes the intermediate horizontal portion 9. The horizontal portions 9 are fastened to the flanges 6 by the breakable bolts 7 and this construction has the advantage of avoiding damage to the soil working members or rotors 3 if they should meet a substantially immovable obstacle during the operation of the harrow since, upon a predetermined resistance to rotation being exceeded, the bolts 7 will shear thus freeing the corresponding flange 6 and shaft 2. It is only necessary to replace the broken bolts 7 to restore the harrow to its fully operative condition. The rotary harrow that has been described above in which the blades 8 have effective lengths of substantially 12 centimeters each is particularly suitable for the rapid preparation of soil for the sowing of cereal crops, the relatively simple construction of the harrow allowing to be manufactured at a competitive price even though it includes a seed drill which enable the cereal crops to be sown simultaneously with the preparation of the seed bed.

What is claimed is:

1. A rotary harrow comprising a frame with coupling means at the front thereof for attaching the harrow to a prime mover, an elongated portion of said frame extending transverse to the direction of travel and a plurality of soil-working members rotatably mounted on upwardly extending shafts supported on said transverse frame portion, drive means connected to said shafts and said soil-working members being rotatable by said drive means, an elongated ground engaging member being positioned in front of said soil-working member and extending for substantially the entire working width of said harrow, said ground engaging member being pivoted to said frame and deflectable against resilient opposition in a forward direction, said member being pivotable about an axis that extends substantially horizontally and perpendicular to the direction of travel, said axis being located substantially in vertical alignment with said ground engaging member.

2. A harrow as claimed in claim 1, wherein said ground engaging member is pivotally connected to spaced apart bracket means at the front of said frame portion with respect to the direction of travel, members being vertically adjustable with respect to said bracket means and means for fixing that member in any one of a plurality of positions.

3. A harrow as claimed in claim 1, wherein said ground engaging member has a lower surface that is rounded off with respect to the direction of travel, said member being normally positioned at a level adjacent said soil-working members and partly supporting said harrow during operation.

4. A harrow as claimed in claim 1, wherein said ground engaging member is a hollow beam having a cross-section generally inclined downwardly and rearwardly from the top thereof, with respect to the direction of travel.

5. A harrow as claimed in claim 2, wherein said bracket means includes spaced apart brackets that extend substantially vertically upwardly from connections to the front of the frame portion and said beam has arms pivoted to the brackets by pins, said pins being located directly above the front of said frame portion.

* * * * *